(12) United States Patent
Gayrard

(10) Patent No.: US 11,038,583 B2
(45) Date of Patent: Jun. 15, 2021

(54) INTERMEDIATE NETWORK COMPOSED OF STATIONS LOCATED ON HIGH-ALTITUDE PLATFORMS FOR A RADIOCOMMUNICATIONS SYSTEM

(71) Applicant: THALES, Courbevoie (FR)

(72) Inventor: Jean-Didier Gayrard, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/617,457

(22) PCT Filed: May 24, 2018

(86) PCT No.: PCT/EP2018/063603
§ 371 (c)(1),
(2) Date: Nov. 26, 2019

(87) PCT Pub. No.: WO2018/219765
PCT Pub. Date: Dec. 6, 2018

(65) Prior Publication Data
US 2020/0266880 A1    Aug. 20, 2020

(30) Foreign Application Priority Data
Jun. 1, 2017   (FR) ...................................... 1700586

(51) Int. Cl.
*H04W 40/22* (2009.01)
*H04B 7/185* (2006.01)

(52) U.S. Cl.
CPC ........ *H04B 7/18504* (2013.01); *H04W 40/22* (2013.01)

(58) Field of Classification Search
CPC ........................... H04B 7/18504; H04W 40/22

USPC ..................... 455/12.1, 11.1, 550.1; 370/316
See application file for complete search history.

(56) References Cited

U.S. PATENT DOCUMENTS

| | | | |
|---|---|---|---|
| 10,727,949 B2* | 7/2020 | Kay | H04B 7/18513 |
| 2012/0068880 A1* | 3/2012 | Kullstam | H01Q 3/26 342/54 |
| 2015/0236778 A1 | 8/2015 | Jalali | |
| 2017/0033455 A1 | 2/2017 | Husted et al. | |
| 2017/0069214 A1* | 3/2017 | Dupray | G08G 5/0013 |
| 2018/0083672 A1* | 3/2018 | Alexander | H04B 7/18504 |

(Continued)

FOREIGN PATENT DOCUMENTS

EP    0 837 567 A2    4/1998

OTHER PUBLICATIONS

Celcer, et al., "Network architectures exploiting multiple HAP constellations for load balancing", Journal WSEAS Transactions on Communications, vol. 7, Issue 3, pp. 160-169, Mar. 2008.

*Primary Examiner* — Danh C Le
(74) *Attorney, Agent, or Firm* — BakerHostetler

(57) ABSTRACT

An intermediate network for a radiocommunication system, the intermediate network includes one or more stations located on high-altitude platforms in order to connect a set of remote base stations to one or more ground stations. The high-altitude platforms are networked by way of communication links, for example high-speed free-space optical links. The invention also proposes to connect remote base stations positioned outside of the area of coverage of the stations located on high-altitude platforms via for example microwave-link relay stations or base stations at the edge of the area of coverage.

11 Claims, 6 Drawing Sheets

(56) References Cited

U.S. PATENT DOCUMENTS

2018/0083678 A1* 3/2018 Alexander ........... H04B 7/0404
2018/0269972 A1* 9/2018 Djordjevic ........... H04B 10/516
2018/0279133 A1* 9/2018 Gayrard ................ H04B 7/026
2018/0343054 A1* 11/2018 Barritt ................ H04B 7/18589
2018/0367638 A1* 12/2018 Gayrard ............ H04W 72/1263
2019/0028197 A1* 1/2019 Turner ................. H04B 10/118

* cited by examiner

INTERMEDIATE NETWORK COMPOSED OF STATIONS LOCATED ON HIGH-ALTITUDE PLATFORMS FOR A RADIOCOMMUNICATIONS SYSTEM

CROSS-REFERENCE TO RELATED APPLICATIONS

This application is a National Stage of International patent application PCT/EP2018/063603, filed on May 24, 2018, which claims priority to foreign French patent application No. FR 1700586, filed on Jun. 1, 2017, the disclosures of which are incorporated by reference in their entirety.

FIELD OF THE INVENTION

The field of the invention is that of intermediate networks of terrestrial radiocommunication systems.

BACKGROUND

The invention relates to an intermediate network for a radiocommunication system. The intermediate network is based on stations located on networked high-altitude platforms and ground stations connected to the core network of the telecommunications operator. The invention is intended for example to competitively deploy broadband radio access networks in large areas with a low population density that do not benefit from a communication infrastructure.

An intermediate network (backhaul network) is a telecommunications network transporting data between a radio access network and a core network of the radiocommunication network operator. The radio access network (RAN) connects user terminals to base stations via radiofrequency links. The intermediate network connects the base stations to the gateway devices that interface the core networks via communication links that are either fiber-optic links, metal cable links, microwave links or satellite links.

The term "station" denotes one or more transmitters or receivers or a combination of transmitters and receivers, including the accessory equipment, necessary at one location for carrying on a radiocommunication service. A station located on a high-altitude platform (HAPS, for high-altitude platform station) denotes a station installed on an object located at a high altitude, for example above 18 km, and at a specified, nominal, fixed point relative to the Earth. A "ground station" denotes a station intended to provide a communication link with a station located on a high-altitude platform. A "base station" denotes a station intended to provide radiofrequency links with mobile or fixed user terminals.

One of the major challenges in deploying a terrestrial radiocommunication system in a region that has little or no telecommunications infrastructure, such as fiber-optic or metal cable-based networks, is that of deploying the intermediate network between base stations distributed in the region as close as possible to users and network gateway devices that interface the core network of the operator and that are located near an Internet backbone.

One problem to be solved for this type of system for accessing a core network consists in designing a solution for linking all of the remote base stations to the network gateway via a broadband communication infrastructure that has low costs in terms of initial investment, operational and maintenance low costs, that preferably exhibits low latency and is reliable.

A first solution for deploying an intermediate network is to connect all of the remote base stations to a network gateway via a network of optical fibers or metal cables. This solution has the disadvantage of a very high cost in terms of initial investment if the network of optical fibers or cables does not exist or only exists in part.

A second solution consists in connecting all of the remote base stations to a network gateway via a microwave-link network. A microwave link is established with direct visibility between two terminal stations that are usually put on masts or at high points. This link has a range that varies from 10 to 50 km depending on the profile of the terrain. The operational distance of microwave links very rarely exceeds around forty kilometers due to the curvature of the Earth (distance to the horizon). Connecting base stations more than 50 km away from the network gateway requires links in several hops, requiring the installation and maintenance of a plurality of relay stations on masts or at high points.

FIG. 1 shows one example of an intermediate network using microwave links according to the prior art. This intermediate network comprises a plurality of remote base stations SB_1, SB_2 equipped with means for establishing a bidirectional microwave communication link 301, 302 with a network of relay stations FH_1, FH_2, FH_3. These relay stations FH_1, FH_2, FH_3 are linked to one another and to a network gateway PR via microwave links 303, 304, 305. The mobile or fixed terminals TU_1, TU_2 are linked to the base stations SB_1, SB_2 via radiofrequency links 201, 202. The network gateway PR interfaces a core network RC via a communication link 101.

The solution described in FIG. 1, using microwave links, has the disadvantage of being expensive in terms of initial investment and of operational and maintenance costs of the relay stations. This solution is no longer economically viable when the distance between the base station and the network gateway is too great (typically greater than 50 km), which is the case in the deployment of a radiocommunication system in a large geographical area.

A third solution consists in connecting all of the remote base stations to the network gateway using satellite links. The base stations are then equipped with a ground station intended to communicate with a satellite, preferably a geostationary satellite. The network gateway is also equipped with a ground station. The cost of this solution is independent of the distances between the base stations and the network gateway, but depends proportionally on the number of base stations to be connected and the data rates to be exchanged. In addition to a high investment and maintenance cost of the ground stations, this solution has the disadvantage of a very high annual cost in terms of leasing satellite capacity (transponder), which makes it economically unsustainable over the long term. In addition, this solution suffers from a long latency (typically greater than 0.3 seconds) due to transmission delays on the outward-return link between the ground and the geostationary satellite. This latency is a major disadvantage in real-time applications such as multi-player video games and an inconvenience for telephone conversations.

SUMMARY OF THE INVENTION

The invention proposes an intermediate network for a radiocommunication system, the intermediate network comprising one or more stations located on high-altitude platforms in order to connect a set of remote base stations to one or more network gateway(s) housed on board high-altitude platforms in order to interface a core network. The high-altitude platforms are networked by way of communication links, for example high-speed free-space optical links. The invention also proposes to connect remote base stations positioned outside of the area of coverage of the stations located on high-altitude platforms via for example microwave-link relay stations or base stations at the edge of the area of coverage.

The invention proposes a competitive and low-latency solution for deploying an intermediate network over a vast geographical area, in comparison with prior-art solutions based on intermediate networks using optical fibers, microwave links or geostationary satellites.

The invention proposes a robust and available solution. The stations located on high-altitude platforms may be networked by way of free-space optical links, for example very high speed laser communications. The system according to the invention comprises a routing element on board the stations located on high-altitude platforms that is controlled by a control center of the network so as to implement various functionalities.

For example, a site diversity technique may be implemented between all of the ground stations of the intermediate network, contributing to increasing the availability of the links between ground stations and stations located on high-altitude platforms.

The routing element may re-route the data traffic from an unavailable ground station to a functional and available ground station, contributing to increasing the robustness of the intermediate network to failures.

The routing element may also dynamically distribute the data traffic between all of the ground stations, contributing to the robustness of the intermediate network to local and temporary traffic overloads.

One subject of the invention is an intermediate network for a radiocommunication system comprising:
  at least one first ground station designed to establish a communication link with a core network,
  a plurality of ground base stations,
  at least one station located on a high-altitude platform, configured so as to put said at least one first ground station into communication with at least one ground base station,
  at least one network gateway housed in said at least one station located on a high-altitude platform,
said at least one station located on a high-altitude platform comprising a routing element for establishing at least one route allowing a ground base station to communicate with a first ground station via a station located on a high-altitude platform, at least one station located on a high-altitude platform being designed to establish a communication link with another station located on a high-altitude platform, said communication link being a free-space optical link.

According to one particular aspect of the invention, each ground base station is designed to establish a bidirectional communication link with at least one user terminal such that said user terminal is able to establish access to the core network via the intermediate network.

According to one particular aspect of the invention, said at least one station located on a high-altitude platform is designed to establish at least one communication link with said at least one first ground station and at least one communication link with at least one base station.

According to one particular aspect of the invention, said communication link between said at least one station located on the stationary high-altitude platform and said at least one first ground station is a free-space optical link.

According to one particular aspect of the invention, said communication link between said at least one station located on the high-altitude platform and said at least one base station is a radiofrequency link or a free-space optical link.

According to one particular aspect of the invention, said at least one station located on a high-altitude platform comprises a switch for activating at least one communication link with the other station located on a high-altitude platform when the communication link between said at least one station located on the high-altitude platform and said at least one first ground station is inoperative.

According to one particular aspect of the invention, at least one first base station is configured so as to establish at least one communication link with at least one second base station when said at least one first base station is not within range of a station located on a high-altitude platform.

According to one particular aspect of the invention, said at least one communication link between two base stations is a microwave-link, fiber-optic or metal cable communication link.

According to one particular aspect of the invention, at least one base station is designed to establish a direct communication link with a core network.

According to one particular aspect of the invention, said at least one high-altitude platform is an aerostat equipped with propulsion means for remaining stationary around a specified, nominal, fixed point relative to the Earth.

According to one particular aspect of the invention, said routing element is controlled by a network control center via the core network and the intermediate network.

Another subject of the invention is a radiocommunication system comprising a core network, a plurality of terminals and an intermediate network according to the invention, allowing said terminals to access the core network.

BRIEF DESCRIPTION OF THE DRAWINGS

Other features and advantages of the present invention will become more clearly apparent upon reading the following description with reference to the appended drawings, in which.

DETAILED DESCRIPTION

Figure 1:
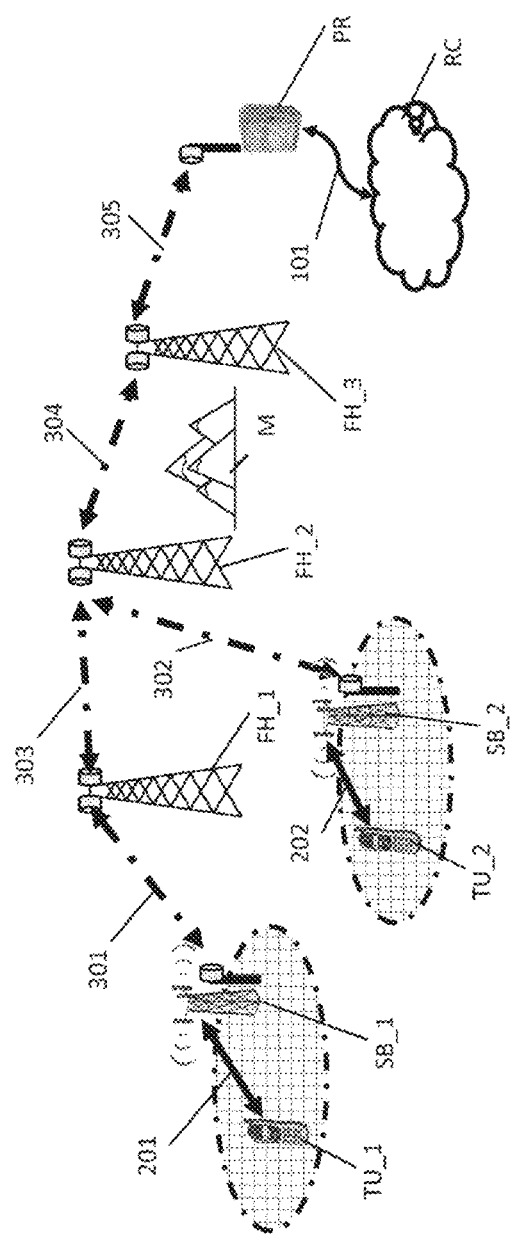
FIG. 1 shows a diagram of an exemplary radiocommunication system according to the prior art based on an intermediate network using microwave links.
Figure 2:
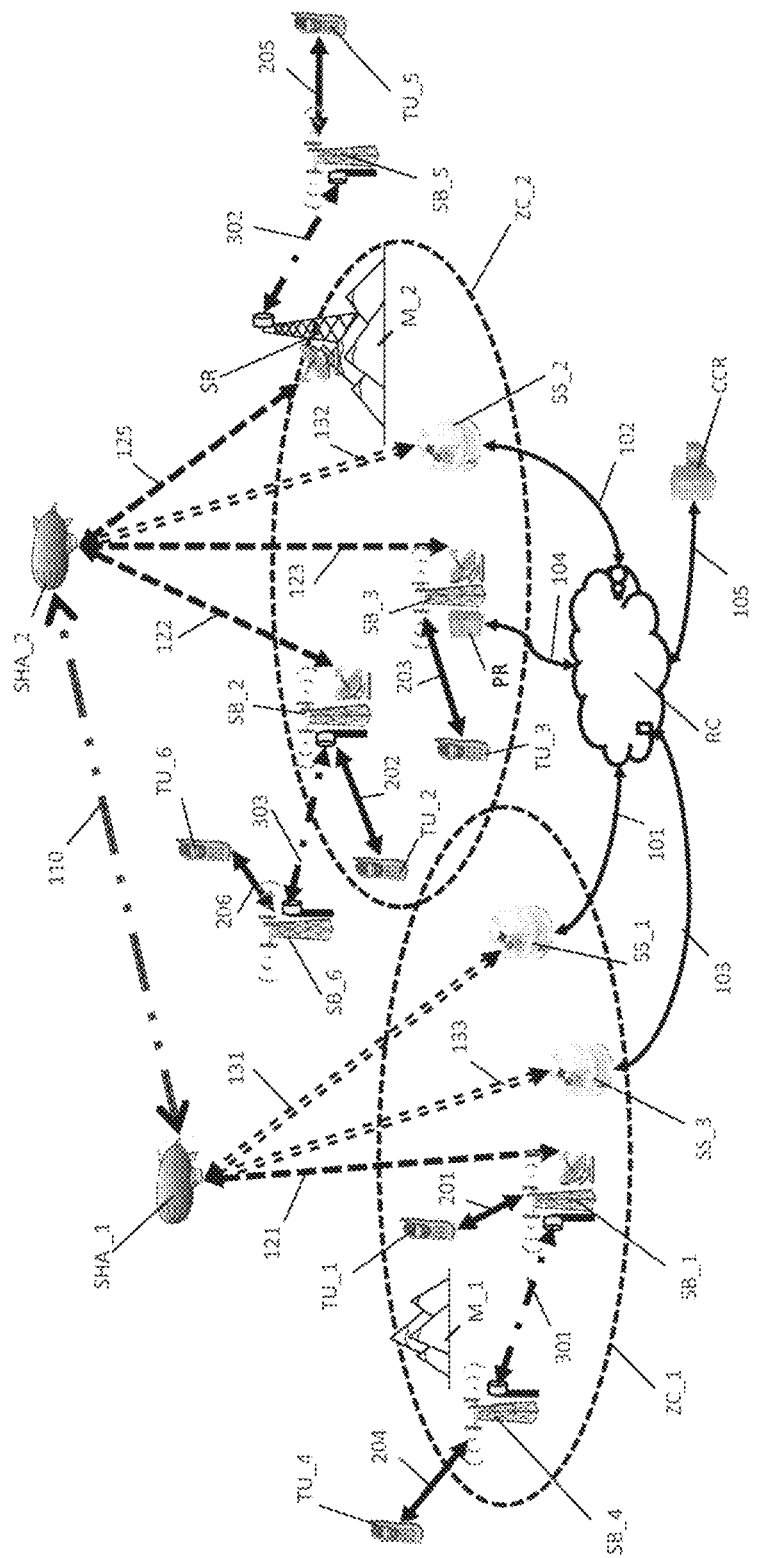
FIG. 2 shows a diagram of an exemplary radiocommunication system comprising an intermediate network based on stations located on high-altitude platforms, according to the invention.

FIG. 2 shows an exemplary radiocommunication system comprising an intermediate network according to one embodiment of the invention. The radiocommunication system described in FIG. 2 comprises an intermediate network based on stations located on networked high-altitude platforms according to the invention. The intermediate network makes it possible to put base stations into communication with ground stations that provide access to a core network. User terminals access the core network from the base stations.

The intermediate network according to the invention thus comprises:

one or more stations located on one or more high-altitude platforms SHA_1, SHA_2 linked to one another by high-speed communication links 110, for example free-space optical links, and each equipped with a routing element, a plurality of ground stations SS_1, SS_2, SS_3 that interface the core network RC via a communication link 101, 102, 103 and that communicate with at least one station located on a high-altitude platform SHA_1, SHA_2 via a communication link 131, 132, 133, for example a free-space optical link, a plurality of base stations SB_1, SB_2, SB_3, SB_4, SB_5, SB_6 that interface the intermediate network via a communication link 121, 122, 123, 301, 125, 302, 303.

Each station located on a high-altitude platform communicates with at least one ground station SS_1, SS_2, SS_3 positioned within its area of coverage ZC_1, ZC_2 and with the base stations SB_1, SB_2, SB_3 positioned within its area of coverage ZC_1, ZC_2.

A ground station SS_1, SS_2, SS_3 is a station comprising firstly means for communicating with a station located on a high-altitude platform, for example an optical terminal and an associated transceiver, and secondly means for interfacing the core network via communication links 101, 102, 103, for example cable links. The communication link 131, 132, 133 between a station located on a stationary high-altitude platform SHA_1, SHA_2 and a ground station SS_1, SS_2, SS_3 is preferably a free-space optical link or a radiofrequency link.

According to the invention, a network gateway function is performed directly on a stationary high-altitude platform SHA_1, SHA_2. The stations SS_1, SS_2, SS_3 are limited to simple ground stations whose role is to physically interface the communication links 131, 132, 133 with the core network RC.

A network gateway notably has the function of performing a protocol conversion in order to interface the communication link 131,132,133 with the core network RC, which is for example an IP network. In other words, the network gateway function performed by a stationary high-altitude platform consists in converting the data and messages received via the link 131, 132, 133, using a compatible protocol, from a free-space optical link or from a radiofrequency link to data and messages able to be used directly by an IP network.

The network gateway possibly comprises a proxy server and a cache server.

A base station SB_1, SB_2, SB_3 is a ground station comprising firstly means for communicating with a station located on a high-altitude platform SHA_1, SHA_2, in particular an antenna and an associated transceiver, and secondly means for communicating with a set of mobile or fixed user terminals TU_1, TU_2, TU_3 via radiofrequency links, in accordance for example with the 4G/LTE mobile communication standard or any other radiofrequency telecommunication standard. A base station SB_1, SB_2 possibly comprises means for communicating with another base station SB_4, SB_6. A base station SB_3 possibly comprises communication means for interfacing the core network RC.

The intermediate network according to the invention comprises a plurality of base stations SB_1, SB_2, SB_3 distributed within the area of coverage ZC_1, ZC_2 and that communicate with user terminals TU_1, TU_2, TU_3 via radiofrequency links 201, 202, 203. Each user terminal TU_1, TU_2, TU_3 accesses a base station SB_1, SB_2, SB_3 which is within its range via a radiofrequency link 201, 202, 203, and then accesses the core network RC via the intermediate network.

In one particular embodiment of the invention, the intermediate network according to the invention also comprises a plurality of base stations SB_5, SB_6 located outside of the area of coverage ZC_1, ZC_2 of a station located on a high-altitude platform and that communicate with user terminals TU_5, TU_6 via radiofrequency links 205, 206. Each base station SB_5, SB_6 outside of the area of coverage ZC_1, ZC_2 is connected to the intermediate network via a base station SB_2 within visibility of the station located on a high-altitude platform SHA_1, SHA_2 or via a microwave-link relay station SR within visibility of the station located on a high-altitude platform SHA_1, SHA_2. Such a base station SB_2 is designed to route the data streams from or to the base stations SB_5, SB_6 outside of the area of coverage to/from a station located on a high-altitude platform SHA_1, SHA_2.

The intermediate network according to the invention possibly comprises base stations SB_4 that are within the area of coverage ZC_1, ZC_2 but that are not within visibility of a high-altitude platform due to the presence of a geographical obstacle M_1. The obstacle M_1 may result from the topology of the terrain or a local configuration of the terrain or a building. The base station SB_4 is linked to the base station SB_1 via a microwave-link or fiber-optic or cable link 301. Each base station SB_4 accesses the intermediate network via a base station SB_1 within visibility of the station located on a high-altitude platform SHA_1, SHA_2.

A station located on a high-altitude platform SHA_1 is able to establish three types of communication link. Firstly, it communicates with the ground station SS_1, SS_3 located within its area of coverage ZC_1 via a free-space optical link 131, 133. Secondly, it communicates with all of the base stations SB_1, SB_2, SB_3 located within its area of coverage ZC_1 via a free-space optical or radiofrequency link 121, 122, 123. Thirdly, it communicates with at least one other station located on a high-altitude platform SHA_2 via a free-space optical link 110.

Each station located on a high-altitude platform SHA_1, SHA_2 is equipped with an element for routing data transported by the various communication links 110, 121, 122, 123, 124, 131, 132, 133 implemented by the station SHA_1, SHA_2. The routing element is controlled by a network control center CCR via the core network RC, via the ground stations SS_1, SS_2, SS_3 and via the stations located on a high-altitude platform SHA_1, SHA_2. The routing element establishes routes for the data traffic between the base stations SB_1, SB_2, SB_3 and the ground stations SS_1, SS_2, SS_3 via the stations located on high-altitude platforms SHA_1, SHA_2.

The high-altitude platform is for example an aerostat. The high-altitude platform is equipped with propulsion means, typically a propeller engine, in order to compensate for wind strength and remain stationary in the sky around a specified, nominal, fixed point relative to the Earth. The area of coverage ZC_1, ZC_2 is the geographical area from which the high-altitude stationary platform is visible from the ground with a positive elevation, for example 5 degrees. Thus, for example, a high-altitude stationary platform flying at an altitude of 20 km allows visibility with an elevation of 5 degrees in an area of coverage with a radius of 194 km. The choice of flight altitude is relatively restricted by the presence of strong winds in the stratosphere. However, between the altitudes of 18 and 25 km, the stratospheric winds are gentler (typically lower than 20 m/s) and this range of altitudes is therefore chosen for positioning the high-altitude platforms.

In one particular embodiment of the invention, at least one base station SB_3 comprises a network gateway functionality and communication means for interfacing the core network RC via a communication link 104.

The intermediate network according to the invention makes it possible to connect all of the remote base stations SB_1, SB_2, SB_3, SB_4 located within the area of coverage ZC_1, ZC_2 to at least one ground station SS_1, SS_2, SS_3. It also makes it possible to connect all of the remote base stations SB_5, SB_6 outside of the area of coverage ZC_1, ZC_2 to at least one ground station SS_1, SS_2, SS_3.

The intermediate network according to the invention thus makes it possible to assist in deploying a radiocommunication system over a wide geographical area in order to offer mobile telephony services and broadband Internet access to fixed or mobile user terminals with a latency similar to that of intermediate networks based on microwave links and with a latency lower than that of intermediate networks based on satellite links. It makes it possible to deploy an intermediate network that is available and robust to failures and to traffic peaks.

According to one variant embodiment of the invention that is also illustrated in FIG. 2, a base station SB_3 may be equipped with a network gateway PR for connecting a remote base station SB_1, SB_2, SB_4, SB_5, SB_6 to the core network RC. When the base stations are deployed, some base stations may be near a core network access point or an Internet backbone. These base stations SB_3 are advantageously equipped with a network gateway PR for interfacing the core network RC and means for establishing a bidirectional communication link 123 with a station located on a high-altitude platform SHA_2. The communications between the base station SB_1, SB_2, SB_4, SB_5, SB_6 and the core network RC transit via a station located on a high-altitude platform SHA_1, SHA_2 and the base station SB_3 equipped with a network gateway PR.

Figure 3:
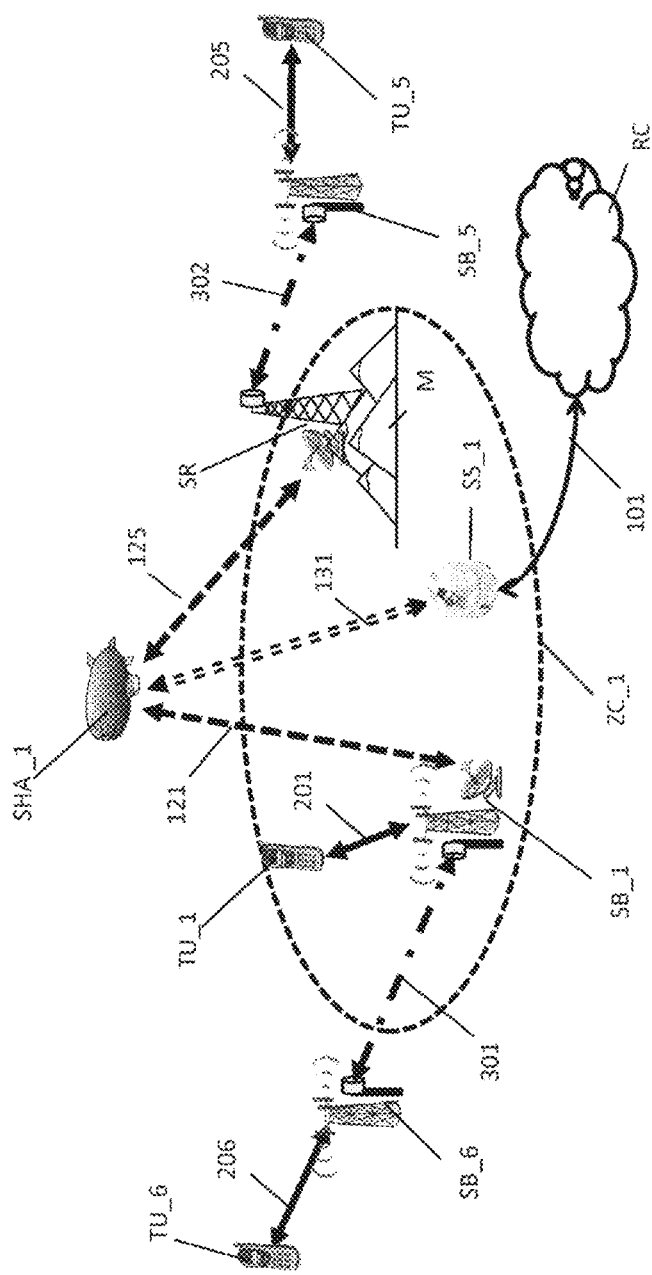
FIG. 3 shows a diagram of part of a radiocommunication system comprising an intermediate network according to the invention in a first particular application configuration, illustrating access to the intermediate network of base stations outside of the coverage of the stations located on high-altitude platforms.

FIG. 3 illustrates a usage case of the invention, making it possible to connect a remote base station SB_5, SB_6 that is not within the area of coverage ZC_1 of the station located on a high-altitude platform SHA_1, that is to say out of visibility of the station, to the core network. The remote base station SB_6 is linked to a base station SB_1 located within the area of coverage ZC_1 within visibility of the station located on a high-altitude platform SHA_1 via a microwave link 301. The microwave link 301 may comprise several hops. The communications between the base station SB_6 and the core network RC transit via the base station SB_1, the station located on a high-altitude platform SHA_1 and the ground station SS_1. Of course, the communication link 301 between the remote base stations SB_1, SB_6 may also be a fiber-optic or metal cable link.

With continuing reference to FIG. 3, another usage case that relates to the base station SB_5 is shown. This station SB_5 is not within visibility of a base station located in the area of coverage ZC_1. The remote base station SB_5 is linked to a relay station SR within visibility of the high-altitude platform SHA_1 via a microwave link 302. The relay station SR is equipped with means for establishing a bidirectional communication link 125 with the station located on a high-altitude platform SHA_1. The relay station SR is advantageously located at a high point M_2 so as to be within visibility of the base station SB_5 and the station located on a high-altitude platform SHA_1. The communications between the base station SB_5 and the core network CR transit via the relay station SR, the station located on a high-altitude platform SHA_1 and the ground station SS_1. Of course, the microwave link 302 may comprise several hops.

Figure 4:
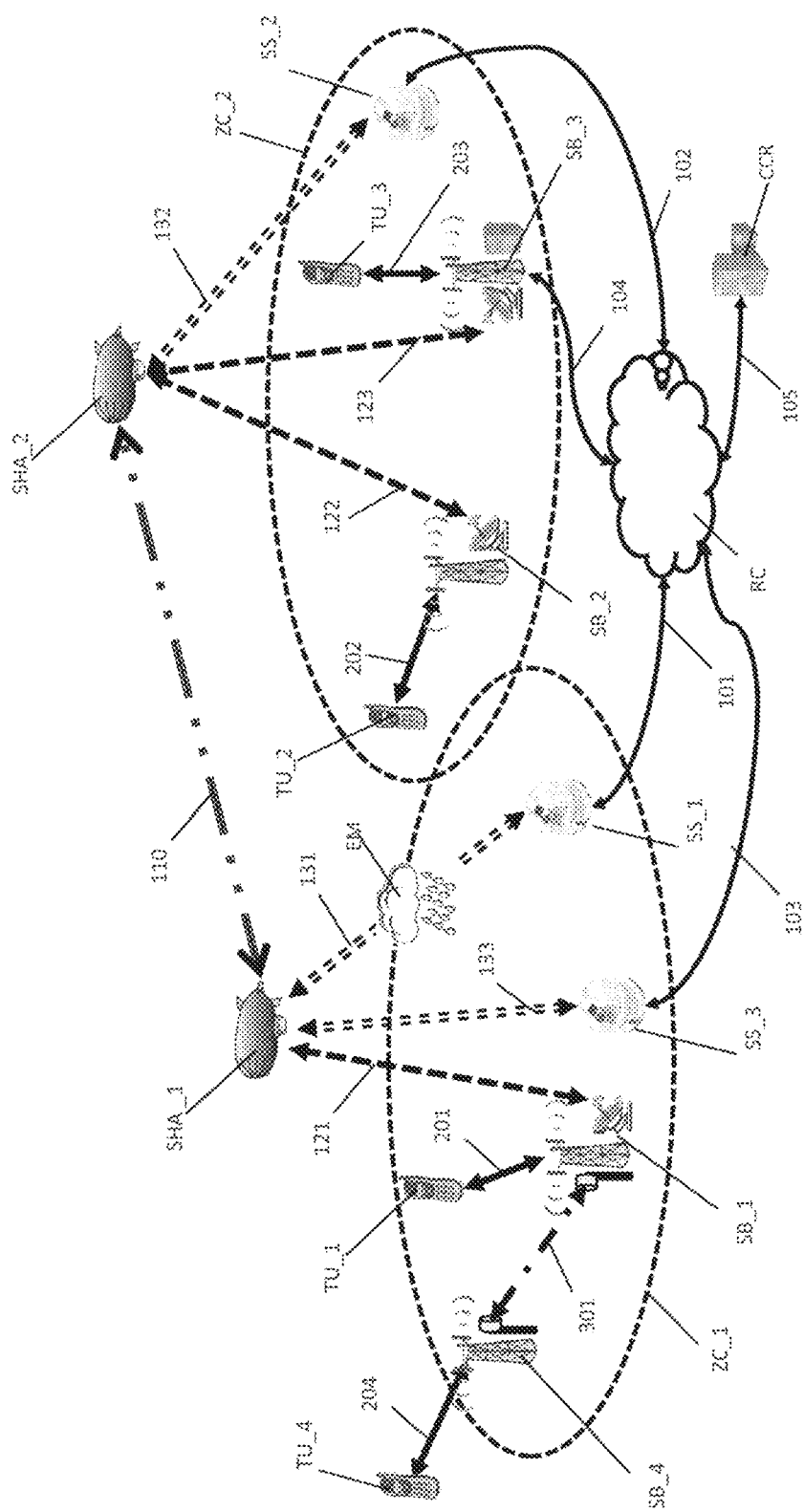
FIG. 4 shows a diagram of part of a radiocommunication system comprising an intermediate network according to the invention, illustrating the advantages in terms of robustness and availability of the intermediate network.

FIG. 4 illustrates the advantages in terms of robustness and availability of the intermediate network according to the invention. Each station located on a high-altitude platform SHA_1 is provided with a device for establishing a communication link 110 with another station located on a high-altitude platform SHA_2 and a routing element or router. The link 110 between two stations located on high-altitude platforms is a free-space optical link. The link 110 may be used to implement a site diversity technique between all of the ground stations SS_1, SS_2, SS_3 and the base stations equipped with a network gateway SB_3. For example, if the link 131 is interrupted or inoperative due to a weather event EM (clouds or thunderstorm) that affects the transmissions between these two devices, a link 110 between the station located on a high-altitude platform SHA_1 and an another station located on a high-altitude platform SHA_2 is used to access the core network RC via another ground station SS_2. Of course, if the link 132 between the station located on a station located on a high-altitude platform SHA_2 and the ground station SS_2 is inoperative, another link is used, for example the link 133 between the station located on a high-platform SHA_1 and the ground station SS_3 or the link 123 between the station located on a high-altitude platform SHA_2 and the base station equipped with a network gateway SB_3.

The links between a station located on a high-altitude platform and a station located on the ground are sensitive to phenomena of the signals being blocked, attenuated and distorted due to clouds and inclement weather (rain, snow, hail, etc.), and they therefore have limited availability. The site diversity technique consists in choosing one operative link from among all of the links between all of the stations located on high-altitude platforms and all of the ground stations. The availability of the link "i_j" between a station located on a high-altitude platform SHA_i and a ground station SS_j is introduced Pi_j. The site diversity technique makes it possible to achieve an overall availability of the intermediate network P equal to $1\Pi_{i,j}(1-Pi\_j)$ multiplied by the availability of the link 110. The link 110 has excellent availability (>99.99%) and does not degrade the overall availability P. Specifically, the link 110 is an air-to-air link between two stations located on high-altitude platforms that are stationed for example in the stratosphere or, more generally, in an area of the atmosphere located above clouds and inclement weather (rain, snow, hail, etc.). In the example of FIG. 4, if the availability of the three links 131 "1_1", 132 "2_2" and 133 "1_3" is 80%, the overall availability of the intermediate network is 99.2%.

Figure 5:
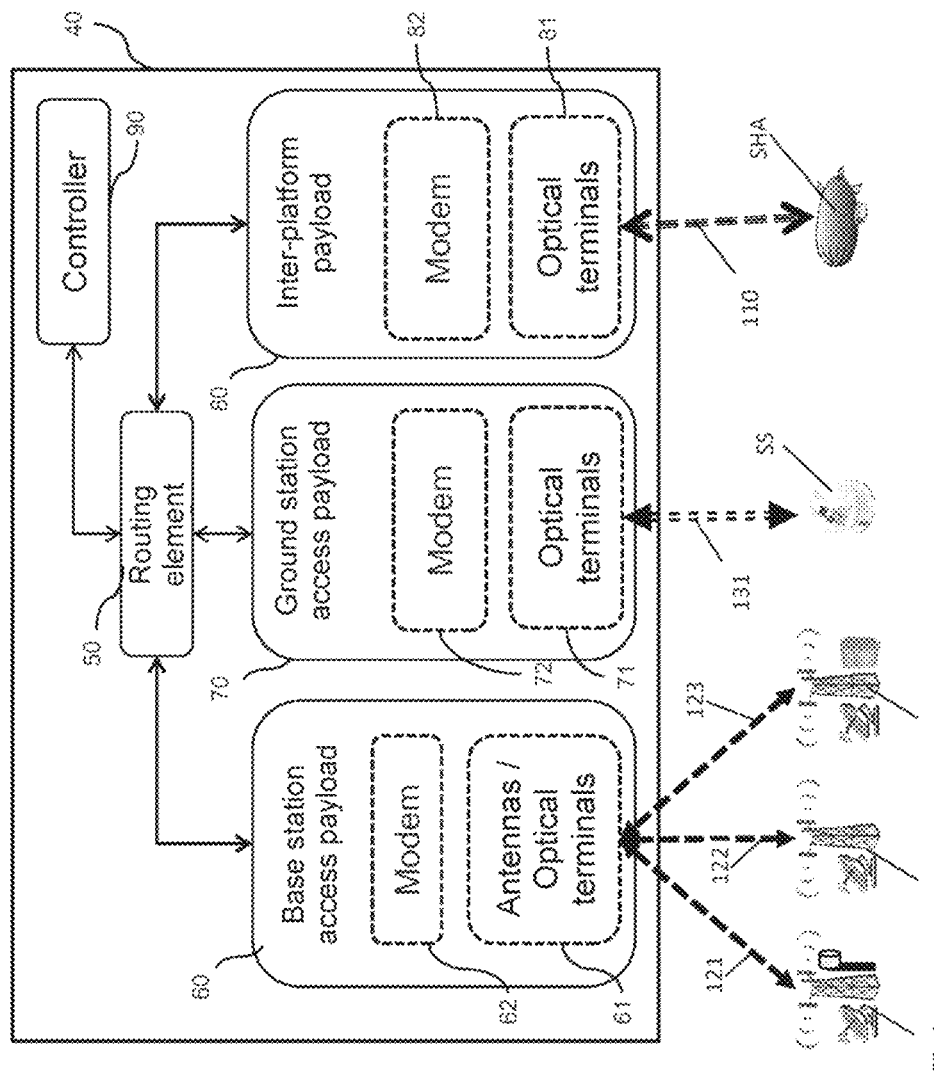
FIG. 5 shows a diagram of an exemplary payload or station located on a high-altitude platform according to the invention.

FIG. 5 outlines an exemplary payload or station of a high-altitude platform SHA_1, SHA_2 according to one embodiment of the invention. The payload 40 comprises a "base station access" payload 60 that comprises a device for establishing one or more bidirectional links 121, 122, 123 with at least one base station SB_1, SB_2, SB_3, a "ground station access" payload 70 that comprises a device for establishing one or more bidirectional links 131 with at least one ground station SS, an "inter-platform" payload 80 that comprises a device for establishing one or more bidirectional links 110 with at least one station located on a stationary high-altitude platform SHA, a routing element 50 and a control device 90.

The "base station access" payload 60 comprises a set of antennas or optical terminals 61 able to establish a bidirectional radiofrequency or optical link 121, 122, 123 with remote base stations SB_1, SB_2, SB_3 and a set of modulators/demodulators 62. The "base station access" payload 60 is connected to the routing element 50 in order to route the data traffic from the base stations to the "ground station access" payload 70 and the "inter-platform" payload 80. The optical communication links are free-space links and are implemented for example by way of infrared lasers. The radiofrequency links use for example the ETSI's DVB-S2 satellite communication standard or any other radiofrequency communication standard.

The "ground station access" payload 70 comprises a set of optical terminals 71 able to establish bidirectional optical links 131 with at least one ground station SS and a set of modulators/demodulators 72. The "gateway station access" payload 70 is connected to the routing element 50 in order to route the data traffic from the ground stations to the "base station access" payload 60 and the "inter-platform" payload 80.

The "inter-platform" payload 80 comprises at least one optical terminal 81 able to establish a bidirectional optical link 110 with at least one other stationary high-altitude platform SHA, and at least one modulator/demodulator 82. The "inter-platform" payload is connected to the routing element 50 in order to route the data traffic from the stations located on a stationary high-altitude platform SHA to the "base station access" payload 60 and the "ground station access" payload 70.

The routing element 50 is configured by a network control center CCR by periodically sending routing configurations. The routing configurations are transmitted by the network control center CCR to the station located on a high-altitude platform SHA in question either directly by a ground station SS located within its area of coverage or by a ground station SS located within the area of coverage of another station located on a high-altitude platform via a link between stations located on high-altitude platforms.

The control device 90 controls and monitors the three payloads 60, 70, 80 and the interface with the avionics system of the high-altitude platform. The control device 90 is connected to the routing element 50 in order to be able to exchange information with the network control center CCR.

Figure 6:
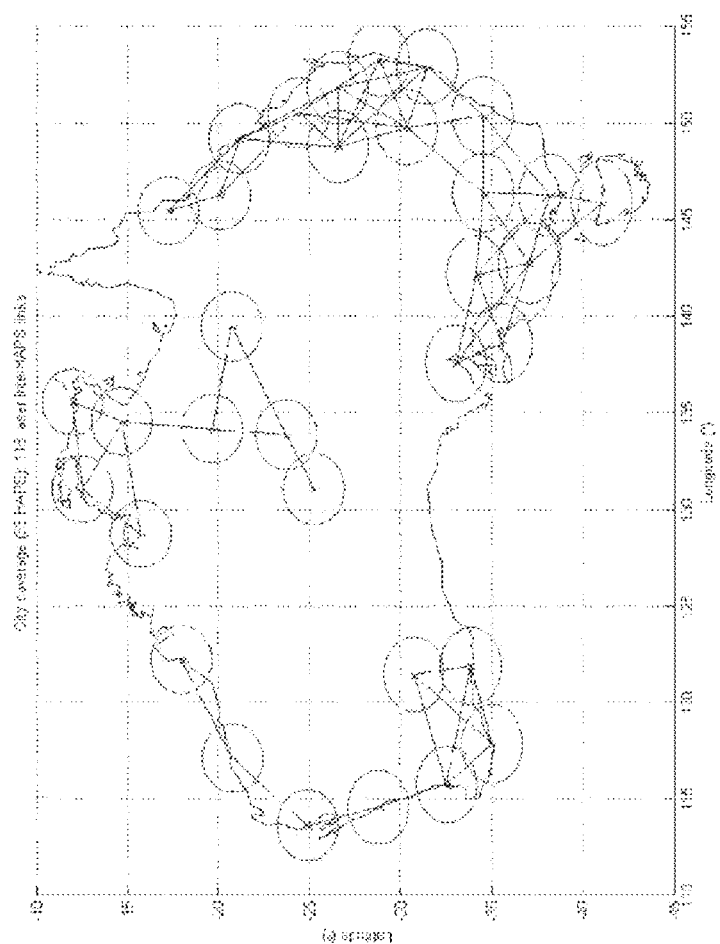
FIG. 6 shows an example of an intermediate network according to the invention deployed in Australia.

FIG. 6 gives an example of deploying an intermediate network according to the invention in Australia. The positions of the high-altitude platforms are marked with an "x". The circles represent the areas of coverage of the stations located on high-altitude platforms. The lines linking two "x"s represent the communication links between stations located on high-altitude platforms. The ground stations are not shown in FIG. 8. They are located inside the circles representing the areas of coverage. The exemplary intermediate network according to the invention shown in FIG. 8 comprises 33 high-altitude platforms arranged in three independent sub-networks: a sub-network of 8 platforms over the west coast, a sub-network of 8 platforms in the north and a sub-network of 17 platforms to the east and over Tasmania.

The invention claimed is:

1. An intermediate network for a radiocommunication system comprising:
    at least one first ground station (SS_1, SS_2, SS_3) designed to establish a communication link with a core network (RC),
    a plurality of ground base stations (SB_1, SB_2, SB_3, SB_4, SB_5, SB_6), at least one station located on a high-altitude platform (SHA_1, SHA_2), configured so as to put said at least one first ground station (SS_1, SS_2) into communication with at least one ground base station (SB_1, SB_2, SB_3),
    at least one network gateway housed in said at least one station located on a high-altitude platform (SHA_1, SHA_2),
    said at least one station located on a high-altitude platform (SHA_1, SHA_2) comprising a routing element for establishing at least one route allowing a ground base station to communicate with a first ground station via a station located on a high-altitude platform,
    at least one station located on a high-altitude platform (SHA_1) being designed to establish a communication link with another station located on a high-altitude platform (SHA_2), said communication link being a free-space optical link,
    wherein said at least one high-altitude platform (SHA_1, SHA_2) is a aerostat equipped with propulsion means for remaining stationary around a specified, nominal point that is fixed relative to the Earth.

2. The intermediate network for a radiocommunication system as claimed in claim 1, wherein each ground base station (SB_1, SB_2, SB_3, SB_4, SB_5, SB_6) is designed to establish a bidirectional communication link with at least one user terminal (TU_1, TU_2, TU_3, TU_4, TU_5, TU_6) such that said user terminal is able to establish access to the core network (RC) via the intermediate network.

3. The intermediate network for a radiocommunication system as claimed in claim 1, wherein said at least one station located on a high-altitude platform (SHA_1, SHA_2) is designed to establish at least one communication link with said at least one first ground station (SS_1, SS_2, SS_3) and at least one communication link with at least one base station (SB_1, SB_2, SB_3).

4. The intermediate network for a radiocommunication system as claimed in claim 3, wherein said communication link between said at least one station located on the stationary high-altitude platform (SHA_1, SHA_2) and said at least one first ground station (SS_1, SS_2, SS_3) is a free-space optical link.

5. The intermediate network for a radiocommunication system as claimed in claim 3, wherein said communication link between said at least one station located on the high-altitude platform (SHA_1, SHA_2) and said at least one base station (SB_1, SB_2, SB_3) is a radiofrequency link or a free-space optical link.

6. The intermediate network for a radiocommunication system as claimed in claim 1, wherein said at least one station located on a high-altitude platform (SHA_1) comprises a switch for activating at least one communication link with the other station located on a high-altitude platform (SHA_2) when the communication link between said at least one station located on the high-altitude platform (SHA_1) and said at least one first ground station (SS_1) is inoperative.

7. The intermediate network for a radiocommunication system as claimed in claim 1, wherein at least one first base station (SB_4, SB_6) is configured so as to establish at least one communication link with at least one second base station (SB_1, SB_2) when said at least one first base station (SB_4, SB_6) is not within range of a station located on a high-altitude platform (SHA_1, SHA_2).

8. The intermediate network for a radiocommunication system as claimed in claim 7, wherein said at least one communication link between two base stations (SB_1, SB_4) is a microwave-link, fiber-optic or metal cable communication link.

9. The intermediate network for a radiocommunication system as claimed in claim 1, wherein at least one base station (SB_3) is designed to establish a direct communication link with a core network (RC).

10. The intermediate network for a radiocommunication system as claimed in claim 1, wherein said routing element is controlled by a network control center (CCR) via the core network (RC) and the intermediate network.

11. A radiocommunication system comprising a core network (RC), a plurality of terminals (TU_1, TU_2, TU_3, TU_4, TU_5, TU_6) and an intermediate network as claimed in claim 1, allowing said terminals to access the core network (RC).

* * * * *